United States Patent
Rohlfing et al.

(10) Patent No.: US 11,235,564 B2
(45) Date of Patent: Feb. 1, 2022

(54) PRISMATIC MOLD FOR DEVICE ATTACHMENT

(71) Applicants: Zachary Scott Rohlfing, Winchester, VA (US); Stuart Paul Scheller, Jr., Stafford, VA (US)

(72) Inventors: Zachary Scott Rohlfing, Winchester, VA (US); Stuart Paul Scheller, Jr., Stafford, VA (US)

(73) Assignee: STACK LLC, Winchester, VA (US)

( * ) Notice: Subject to any disclaimer, the term of this patent is extended or adjusted under 35 U.S.C. 154(b) by 480 days.

(21) Appl. No.: 16/145,255

(22) Filed: Sep. 28, 2018

(65) Prior Publication Data

US 2020/0101706 A1     Apr. 2, 2020

(51) Int. Cl.
  *B32B 37/00*     (2006.01)
  *B33Y 80/00*     (2015.01)
  *B29L 31/00*     (2006.01)
  *B29K 67/00*     (2006.01)
  *B29C 64/118*    (2017.01)

(52) U.S. Cl.
  CPC .......... *B32B 37/0046* (2013.01); *B33Y 80/00* (2014.12); *B29C 64/118* (2017.08); *B29K 2067/00* (2013.01); *B29K 2867/00* (2013.01); *B29K 2995/006* (2013.01); *B29L 2031/757* (2013.01); *B32B 2451/00* (2013.01)

(58) Field of Classification Search
  CPC ............ B32B 37/0046; B32B 2451/00; B29C 64/118; B29K 2067/00; B29K 2867/00; B29K 2995/006; B29L 2031/757; B33Y 80/00
  See application file for complete search history.

(56) References Cited

U.S. PATENT DOCUMENTS

| | | | | |
|---|---|---|---|---|
| 1,774,736 A | * | 9/1930 | Tomec | D06N 7/0028 428/47 |
| 1,847,574 A | * | 3/1932 | Sigel | G09F 7/16 156/250 |
| 3,574,017 A | * | 4/1971 | Kass | B44C 1/28 156/63 |
| 5,172,622 A | * | 12/1992 | Sabin | B23D 35/008 83/146 |
| 5,306,374 A | * | 4/1994 | Hambright | D06Q 1/12 156/230 |
| 5,415,723 A | * | 5/1995 | Rodriguez | B44C 3/12 156/228 |
| 6,884,489 B2 | * | 4/2005 | Kessler | A47L 23/26 428/100 |
| 6,893,527 B1 | * | 5/2005 | Doane | C08J 7/0427 156/244.11 |
| 2006/0212993 A1 | * | 9/2006 | Wang | A42C 5/00 2/171 |
| 2007/0277472 A1 | * | 12/2007 | Sinclair | E04C 1/397 52/605 |
| 2008/0174037 A1 | * | 7/2008 | Chen | B44C 1/28 264/40.1 |
| 2012/0223036 A1 | * | 9/2012 | Holmquist | G09F 7/18 211/85.2 |
| 2012/0237656 A1 | * | 9/2012 | Henry | A47J 37/01 426/512 |

(Continued)

*Primary Examiner* — Kevin R Kruer (57) ABSTRACT

A prismatic mold having a molding surface having a floor and opposing sidewalls and at least one indentation in a three-dimensional shape of a distinguishing device, is described.

15 Claims, 3 Drawing Sheets

(56) References Cited

U.S. PATENT DOCUMENTS

| | | | | |
|---|---|---|---|---|
| 2013/0052446 A1* | 2/2013 | Nair | ............... | C09K 19/322 |
| | | | | 428/220 |
| 2013/0337126 A1* | 12/2013 | Mys | ............... | A47B 81/00 |
| | | | | 426/389 |
| 2015/0173564 A1* | 6/2015 | Yung | ............... | C08K 3/34 |
| | | | | 428/220 |
| 2017/0006820 A1* | 1/2017 | Clark | ............... | A01J 19/00 |
| 2017/0043613 A1* | 2/2017 | Hermann | ............... | A44C 17/04 |
| 2017/0188588 A1* | 7/2017 | Wirth | ............... | A21B 3/13 |
| 2018/0029304 A1* | 2/2018 | Pauli | ............... | B29C 33/405 |
| 2019/0176452 A1* | 6/2019 | Wu | ............... | B32B 7/12 |
| 2020/0189225 A1* | 6/2020 | Schmidt | ............... | B32B 15/10 |

\* cited by examiner

PRISMATIC MOLD FOR DEVICE ATTACHMENT

TECHNICAL FIELD

This invention relates to a device and method for attaching distinguishing devices on ribbons for the uniforms of the armed forces or other professions that use distinguishing devices.

BACKGROUND

Currently every service of the United States Military, and most international militaries utilize a standard military ribbon. The ribbon varies in color and design, but the measurements are generally consistent: 1⅜ inch long and ⅜ inches tall. For every military that uses the ribbon on a dress uniform, there are distinguishing devices that need to be attached to the ribbon. If the service member wants to adhere the device onto his ribbon (as opposed to the standard dual bracket backing), there currently is no product that facilitates this process efficiently, accurately and neatly.

SUMMARY

In general, a prismatic mold includes a molding surface having a floor, at least one sidewall extending upward from the floor and having a length along longitudinal axis of the floor and a height, the distance between the sidewall's height and the floor forming a first depth of the molding surface, and a stopping wall, the floor comprising at least one indentation in a three-dimensional shape of a distinguishing device, indentation having a volume that accommodates the distinguishing device and an adhesive, the indentation having a lowest point, the distance between the lowest point and the floor forming a second depth of the molding surface, the sidewall dimensioned to accommodate a ribbon in a fixed position over the distinguishing device in a predetermined position and prevent movement in a latitudinal plane, and the stopping wall dimensioned to accommodate a ribbon in a fixed position over the distinguishing device in a predetermined position and prevent movement in a longitudinal plane.

In certain embodiments, a prismatic mold can have a molding surface that includes a second sidewall such that a prismatic mold includes a molding surface having a floor and opposing sidewalls extending upward from the floor, the opposing sidewalls having a length along longitudinal axis of the floor and a height, the distance between the sidewalls' height and the floor forming a first depth of the molding surface; the floor comprising at least one indentation in a three-dimensional shape of a distinguishing device, indentation having a volume that accommodates the distinguishing device and an adhesive, the indentation having a lowest point, the distance between the lowest point and the floor forming a second depth of the molding surface, the opposing walls spaced apart and dimensioned to accommodate a ribbon in a fixed position over the distinguishing device in a predetermined position and an adhesive positioned between the ribbon and the distinguishing device.

In certain embodiments, the distinguishing device is a star, ⁵⁄₁₆ inch star, an arrowhead, a campaign clasp, a campaign star, a citation star, an enlistment bar, an insignia, a globe, a loop, an hourglass, a cross, an "A" device, an "M" device, an "N" device, a commendation star, an oak leaf cluster, an operational distinguishing device, an "R" device, a service star, a strike numeral, a flight numeral, or a "V" device.

In some embodiments, the ribbon is a military ribbon. The ribbon can also be a service badge.

In certain embodiments, the indentation is dimensioned to accommodate a predetermined amount of adhesive and prevent an excess of the adhesive from being transferred to the ribbon.

In some embodiments, the indentation positioned to accommodate the distinguishing device based on military uniform regulations.

In certain embodiments, the prismatic mold further includes a second indentation.

In certain embodiments, the prismatic mold further includes a plurality of indentations.

In some embodiments, the prismatic mold further includes at least a second molding surface positioned comprising a floor and opposing sidewalls, the second molding surface positioned at an angle to the first molding surface.

In certain embodiments, the prismatic mold, further includes at least a third molding surface comprising a floor and opposing sidewalls, the third molding surface positioned at an angle to the first and second molding surface.

In other embodiments, the prismatic mold further includes at least a fourth molding surface comprising a floor and opposing sidewalls, the third molding surface positioned at an angle to the first, second, and third molding surface.

In certain embodiments, the prismatic mold has a square cross-section, each side of the square defining a transverse axis of a molding surface.

In some embodiments, the molding surface is comprised of an elastomeric material. The molding surface can also be comprised of a 3D printer filament.

In some embodiments, the molding surface can be comprised of polylactic acid (PLA), acrylonitrile butadiene styrene (ABS), polypropylene, polyethylene, acetal acrylic, nylon, polyamide, polystyrene, polyvinyl chloride, polycarbonate, rubber, silicone, or polymeric material.

In some embodiments, the molding surface is comprised of a biodegradable and thermoplastic aliphatic polyester. In some embodiments, a molding surface is comprised of a coated material. In some embodiments, the molding surface is integral with the prismatic mold.

In general, an attachment system can include a molding surface having a floor and opposing sidewalls extending upward from the floor, the opposing sidewalls having a length along longitudinal axis of the floor and a height, the distance between the sidewalls' height and the floor forming a first depth of the molding surface; the floor comprising at least one indentation in a three-dimensional shape of a distinguishing device, indentation having a volume that accommodates the distinguishing device and an adhesive, the indentation having a lowest point, the distance between the lowest point and the floor forming a second depth of the molding surface, the opposing walls spaced apart and dimensioned to accommodate a ribbon in a fixed position over the distinguishing device in a predetermined position and an adhesive positioned between the ribbon and the distinguishing device, and a severing element to allow backings on distinguishing devices to be detached.

In general a method of manufacturing a prismatic mold comprising measuring the dimensions of a ribbon and a distinguishing device measuring the placement of a distinguishing device on a ribbon. The method can also include creating a 3-Dimensional digital file with a computer aided design program. The method can also include forming a molding surface having a floor and opposing sidewalls extending upward from the floor, the opposing sidewalls having a length along longitudinal axis of the floor and a height that forms a first depth of the molding surface, the floor comprising at least one indentation in the shape of a distinguishing device, the indentation forming a second depth of the molding surface, the second depth being greater than the first depth and configured to accommodate the distinguishing device and an adhesive, the opposing walls spaced apart and dimensioned to accommodate a ribbon over the distinguishing device in a predetermined position and an adhesive positioned between the ribbon and the distinguishing device.

DETAILED DESCRIPTION

The claimed device is a prismatic mold which is a mold having a three-dimensional prism shape and at least one surface measured and dimensioned to attach a distinguishing device onto a ribbon. The Perfect Ribbon™ is an exemplary embodiment of the claimed device.

Figure 1:
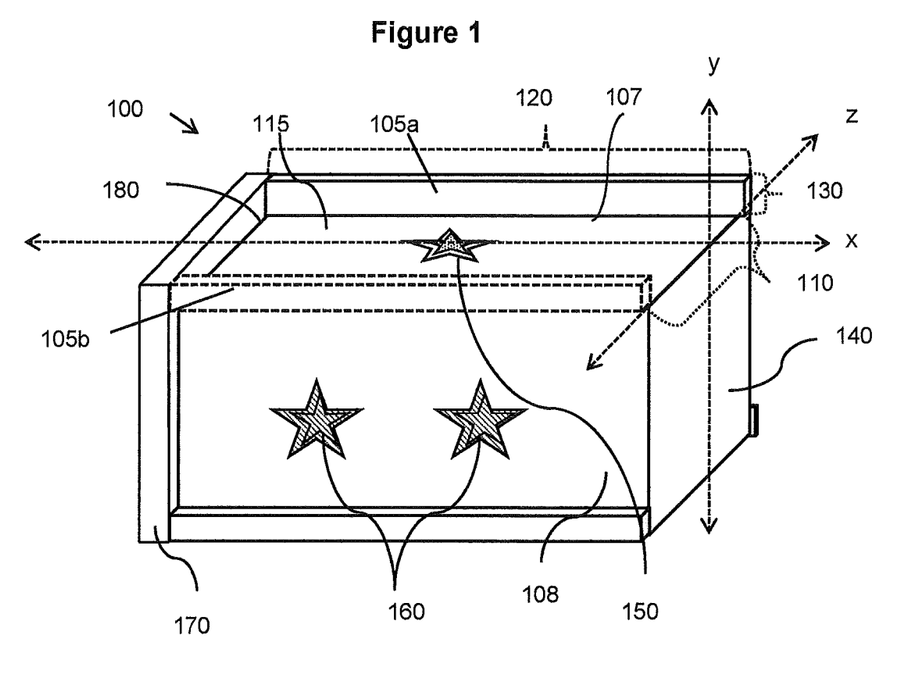
FIG. 1 shows a prismatic mold in a rectangle prism shape with a cavity dimensioned to accommodate a ribbon in a fixed position, and an indentation within the cavity to dimensioned to hold a distinguishing device.

Referring to FIG. 1, the prismatic mold 100 has a molding surface 180 defined by a floor 115 and a sidewall 105a extending upward from the floor, the molding surface having a length 120, a width 110 and a height 130 specifically dimensioned to accommodate and hold a ribbon in a fixed position. The length 120 is measured along a longitudinal axis x to be a distance of the length of a molding surface 180. The width 110 is measured along a latitudinal axis z to be a distance of the width of a molding surface 180.

In certain embodiments, the molding surface can have a second sidewall 105b (shown in dashed line), and the surface can be defined by a floor 115 and opposing sidewalls 105a and 105b extending upward from the floor, the molding surface having a length 120, a width 110 and a height 130 specifically dimensioned to accommodate and hold a ribbon in a fixed position. The length 120 is measured along a longitudinal axis x to be a distance of the length of a molding surface 180. The width 110 is measured along a latitudinal axis z to be a distance of the width of a molding surface 180. In certain embodiments, the opposing sidewalls can have the same height. In other embodiments, the opposing sidewalls need not have the same dimensions, so long as they are capable of holding the ribbon securely during attachment.

In certain embodiments, the prismatic mold can also have a stopping wall 170. The stopping wall is measured and dimensioned to prevent movement of the ribbon in the cavity along the in the x axis (e.g. longitudinal plane), while a sidewall prevents movement alone the z axis (e.g., latitudinal plane), such that it cannot twist or move during the attachment process.

In certain embodiments, the prismatic mold can have a molding surface with three walls, the stopping wall 170 secure the ribbon on a third side (along the x axis or longitudinal plane) while the opposing sidewalls serving as the first two sides prevents to movement alone the z axis (e.g., latitudinal plane), such that the ribbon cannot twist or move during the attachment process.

The height 130 of the sidewall is measured along an axis y to be a height of the sidewalls from the floor of a molding surface. The width 110, length 120 and height 130 of a molding surface 180 form a volume of a cavity 107 in a molding surface. The width of the molding surface is measured to match the measurement of the width of a ribbon such as a standard service ribbon. It must accommodate and secure the ribbon in a fixed position during the attachment process, and is thus a fixed dimension. The length of the molding surface can be varied, so long as it supports the ribbon. For example, it can measure less than or greater than the length of a ribbon so long as it is of sufficient length to secure the ribbon during the attachment process. The height of a molding surface (e.g. the height of the opposing sidewalls) can also be varied, so long as it capable of holding the ribbon securely. For example, it can measure half the height of a ribbon, or be 1.5 times the height of a ribbon, so long as it allows the ribbon to be secured during the attachment process.

The floor 115 is designed to have least one indentation 150 in a three-dimensional shape of a distinguishing device, the indentation configured to hold a distinguishing device and an adhesive for secure attachment to a ribbon. In certain embodiments, the floor can also have a plurality of indentations 160 to hold a plurality of distinguishing devices, for example two stars, in a predetermined distance and space. In certain embodiments, the prismatic mold can also have a second molding surface 108, which can in turn, have its own indentations.

The prismatic mold can have a polygonal surface 140, which can have for example, a rectangular cross-section. Each side of the prismatic mold can have its own molding surface. Thus, for example, a prismatic mold having a rectangular cross-section can have up to four molding surfaces. A prismatic mold having a triangular cross-section can have up to three molding surfaces. A prismatic mold having a pentagonal cross-section can have up to five molding surfaces. In other embodiments, not every surface of a prismatic mold corresponds to a molding surface, but can be a flat surface for any other suitable purpose (e.g. stability or serving as an identification surface or a surface for bearing a logo, alphanumeric character, or other emblem).

The height of the sidewall or opposing sidewalls is measured to prevent movement of the ribbon. It can measure to be the same height as the ribbon, but it can also be less or more than the height of the ribbon, so long as the ribbon can be secured in a fixed position. The length of the molding surface is measured to accommodate the ribbon in a fixed position. It can be measured to have the same length as the ribbon, but it can also be less or more than the length of the ribbon so long as the ribbon can be secured in a fixed position.

The indentation is measured to have a volume that corresponds to the specifications of the distinguishing devices. If a plurality of indentations are provided, they are spaced apart and positioned according to the military specifications and regulations, thereby obviating the need for a user to research such military specifications and regulations to arrive at the requisite positioning of the distinguishing device.

Figure 2:
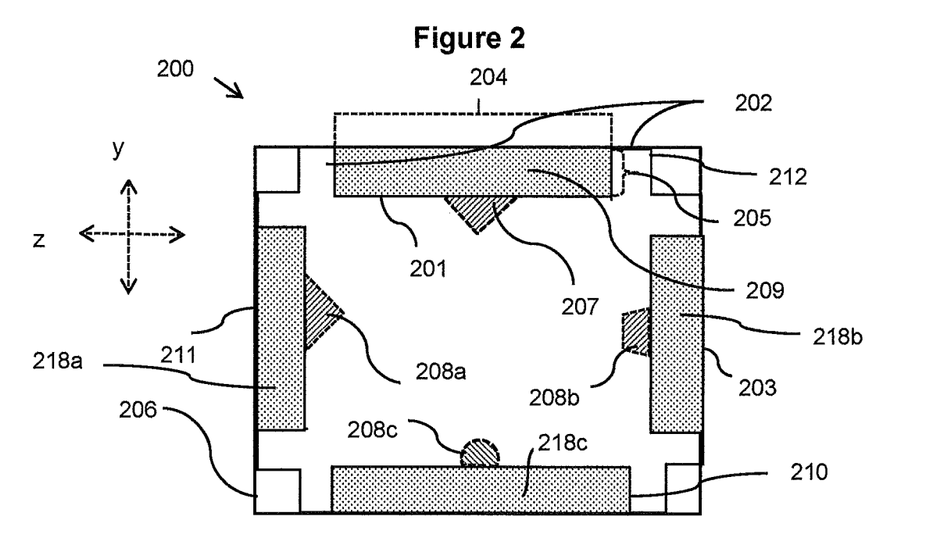
FIG. 2 shows a cross-section of a prismatic mold having a plurality of molding surfaces.

Referring to FIG. 2, the prismatic device 200 is shown as a cross-section taken across the z and y axes of FIG. 1. The prismatic device has at least one molding surface 212 having a cavity 209 formed by a floor 201 and opposing sidewalls 202. In certain embodiments, it can also have at least a second molding surface 211. In other embodiments, it can also have at least a third molding surface 203. In other embodiments, it can further have at least a fourth molding surface 210, each on the different sides of the mold.

The stopping wall 206 can be measured and dimensioned to prevent movement of the ribbon on each of the molding surfaces. There prismatic device can also have at least a second indentation 208a within at least a second cavity 218a. In other embodiments it can also have at least a third indentation 208b within at least a third cavity 218b. In other embodiments, it can also have at least a fourth indentation 208c within at least a fourth cavity 218c. The indentations can be measured and formed in any three-dimensional shape of a distinguishing device including stars, bars, alpha/numeric characters, clasps, arrowheads, leaves, hourglass, loops, crosses, seals, and other similar three-dimensional shapes.

In the indicated cross-section, the molding surface has a width 204, and the opposing sidewalls have a height 205.

Figure 3:
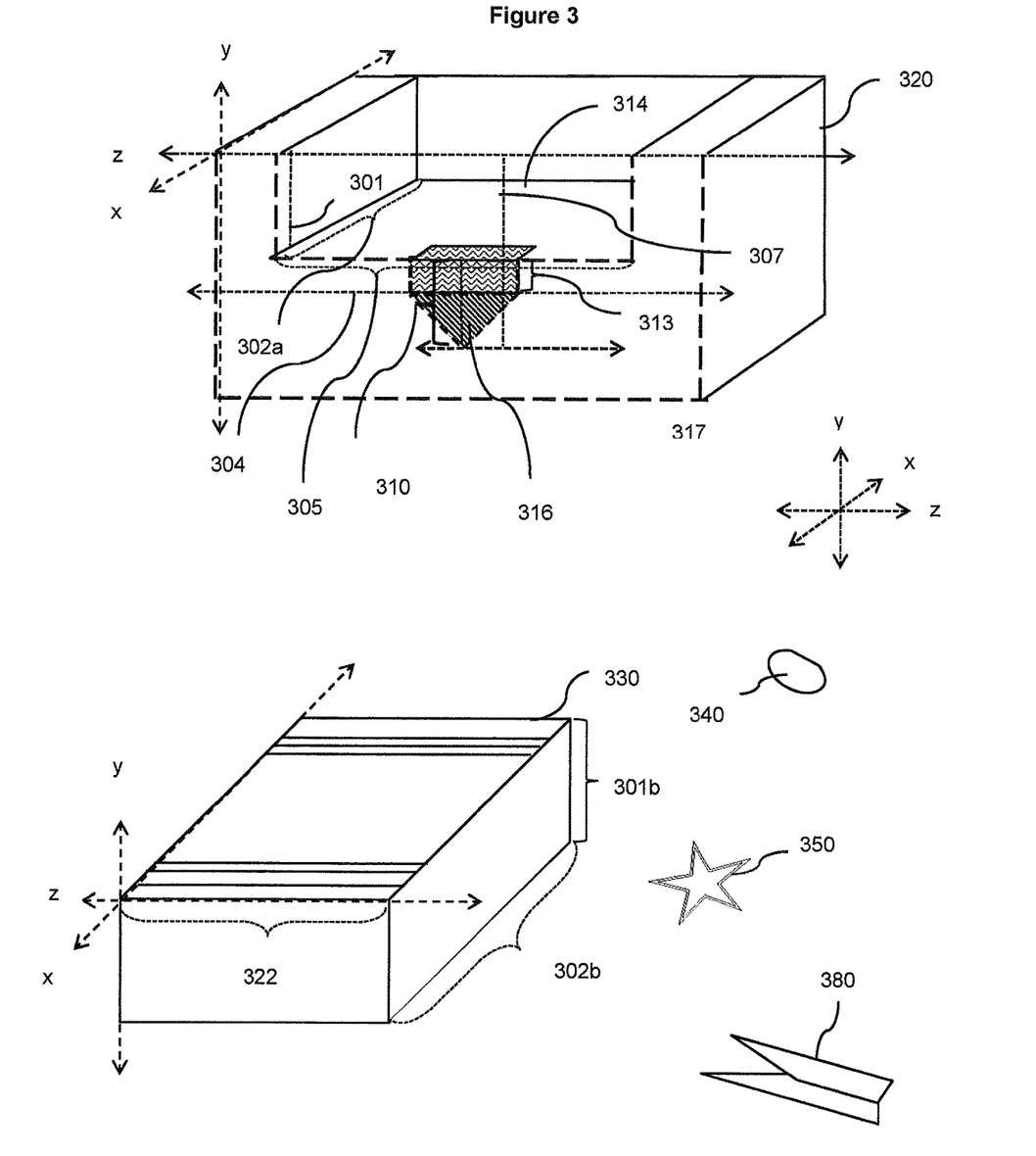
FIG. 3 shows a cross-section of a perspective view of a prismatic mold having opposing sidewalls, a stopping wall, a cavity having a width to accommodate the ribbon in a fixed position, an indentation to hold a distinguishing device and a volume of adhesive; an adhesive, a distinguishing device with a backing, and a severing element.

Referring to FIG. 3, a cross-section perspective is shown of the prismatic device, taken along the x, y and z axes from FIG. 1. The molding surface has a cavity formed by the floor 314 and opposing sidewalls 320 and accommodates a ribbon in a secure and fixed position during the process of attaching the distinguishing device. The cavity is measured to have a height 301 of opposing sidewalls 301, the width 305 of the floor and the length 302a of the floor. The width 305 must have the same measurement as the width 322 of the ribbon 330. The length of the ribbon 302b and the height of the ribbon 301b must be accommodated by the prismatic device, but the corresponding length 302a and height 301 of the opposing sidewalls 320 need not be exactly the same measurement of the ribbon, so long as the ribbon is accommodated securely and can be fixed in position during the attachment process.

The indentation 316 has a volume that accommodates the distinguishing device 350 and an adhesive 340, the indentation having a distance 310 between a lowest point and an indentation surface plane 304. The distance between the lowest point and the top of the sidewalls forms a first depth 307 of the molding surface, and the distance between the lowest point and the floor forms a second depth 310 of the molding surface. In certain embodiments, the indentation can contain an additional three-dimensional space (adhesive space) 313 measured to accommodate an amount of adhesive, such as a predetermined amount measured to affix the distinguishing device. The amount of adhesive can be for example, drop (for example, about 0.01-0.05 ml), two drops, three drops, or more as needed, to affix the ribbon over the distinguishing device but without spilling over onto the ribbon.

This adhesive space is measured as the volume between the plane 304 bordering the distinguishing device and the plane of the floor 314. The adhesive space is measured to hold a volume of adhesive sufficient to affix the distinguishing device without an excess spilling over onto the ribbon.

The general concept is that an individual purchases the ribbon 330 and the distinguishing device 350, uses a severing element 380, and uses the claimed mold to easily adhere the device to the center of the ribbon neatly and efficiently. The distinguishing device is placed into the mold with the flat side facing up, a drop of adhesive, such as glue, is placed on the back side of the distinguishing device, the ribbon is then placed into the mold flat side facing down, the individual waits for the adhesive to dry, and then the individual pulls the ribbon out of the mold after a period sufficient to allow the adhesive to dry (e.g., about one minute) with the distinguishing device perfectly centered and attached.

General Design

Because of the design, the adhesive or glue is contained and will not leak outside of the device onto the face of the ribbon. The claimed device makes it more efficient, more accurate and neater to center the devices in the correct position without the ribbon moving about while the attachment process is taking place. Moreover, there, not only is there efficiencies gained in the attachment process, but importantly, the individual saves a significant amount of time by not having to research the requisite orders such as military order publications to obtain the proper the spacing, measurement, and/or placement of devices on the ribbon, which is particularly pertinent with multiple devices on a ribbon, because the individual can trust the pre-measured and dimensioned spacing on the claimed product as verified and correct.

Service members must comply with precise rules when it comes to their uniforms. When building a ribbon stack, an individual generally buys the ribbons and distinguishing devices separately. Conventionally, individual users must decide if they want to: (1) glue the distinguishing device to the ribbon or (2) use the dual bracket backing (e.g. piercing structure) that comes standard on most distinguishing devices.

If using dual bracket backing (piercing method), the service member applies dual bracket backing to pierce the ribbon, and hold the device in place. The problem is that this often results in the distinguishing device twisting or moving around and ultimately not being properly centered, or inevitably the device falls off. Ultimately the bracket is not secure and allows too much wiggle and likelihood of coming undone, and thereby preventing the service member from complying with uniform rules. As a result, most uniform stores that build ribbon stacks for customers, or individuals that build the ribbon stacks themselves choose to cut off the dual bracket backing and glue the devices on the ribbons.

Even with gluing, however, there are problems with properly and securely attaching the device. Currently, there are two main techniques used when gluing the distinguishing devices, but none are efficient. There are two main techniques used to glue the distinguishing devices onto the ribbon. The first technique is known as the tape method. The tape method consists of placing the distinguishing device on tape, placing glue on the back side of the distinguishing device, and then pressing the tape against the ribbon while trying to get the distinguishing device centered. This is problematic because sometimes "centering" the device is generally done by a visual estimate, and therefore results in the device not in fact being centered. At times, the distinguishing device sticks to the scotch tape and does not release as planned, or it simply fails stay on the scotch tape as intended. The result is an inaccurate or sloppy attachment.

The second technique is known as the tweezer method. This involves placing glue on the distinguishing device or the ribbon and attaching the distinguishing device with a tweezer to the ribbon surface. However, this also creates problems because oftentimes, the glue drips off the back of the distinguishing device while trying to attach, or it spills over to the ribbon when pressure is applied and the glue is sandwiched between the distinguishing device and the ribbon. These problems are overcome with the claimed mold and method.

The claimed mold securely, accurately and efficiently attaches the standard size ribbon and various distinguishing devices. The following is a list of exemplary distinguishing devices that the invention addresses:

5/16 inch star (gold or silver)
"A" Device
Arrowhead device
Battle E device
Berlin Airlift Device (Cold War, 1947-1948)
Battle star (3/16"), bronze or silver
"C" device (1/4")
Campaign clasp
Campaign star (3/16"), bronze or silver
Citation Star (3/16"), WWI, "Silver Star"
Enlistment Bar
Fleet Marine Force Combat Operation Insignia
Globe Device
Good Conduct Loop
Hourglass Device
Hurricane Device
Marksmanship Devices
Maltese Cross
"M" Device
"N" Device (Navy)
"N" Device (Air Force)
Navy Commendation Star (3/16"), WWI, silver
Numeral device
Oak leaf cluster (5/16" or 13/32"), bronze or silver
Operational Distinguishing Device
"R" device (1/4")
Service star (3/16"), bronze, silver and gold
Strike/Flight numerals
"V" device
Wintered Over Device
Wake Island Device (World War II)

If the individual purchases the distinguishing device and the ribbon, that is needed is the claimed prismatic mold and some glue to easily and efficiently attach the device to the ribbon. The claimed mold and method requires that the distinguishing device have a relatively flat back surface to facilitate proper attachment. Thus, if the distinguishing device has a standard dual bracket backing, it must be severed so that the distinguishing device can be placed into the correlating indentation (measured and dimensioned to accommodate the distinguishing device securely) within the mold with the flat side of the distinguishing device facing up. The amount of adhesive needed will depend on the size and shape of the distinguishing device, but can range, for example, between 10-25 microliters, 25-50 microliters, 50-75 microliters, 75-100 microliters, 100-125 microliters or 125-150 microliters. The measurements of the indentation, including its width, length depth can be pre-measured and dimensioned so that an appropriate amount of adhesive is applied without spillage or leaking into the ribbon upon attachment.

The individual can then place an amount of adhesive on the back surface of the distinguishing device. This includes ensuring that the adhesive does not run over the indentation and spill over and thus provide too much adhesive. The individual can then place the ribbon face down into the cavity of the mold. The individual would then wait for the adhesive to dry and then he can remove the ribbon from the mold with the distinguishing device securely attached to the ribbon. Depending on the type of adhesive used, the drying time can range from a few seconds (e.g. 5 seconds) to a few minutes (e.g. 5 minutes).

Figure 4:
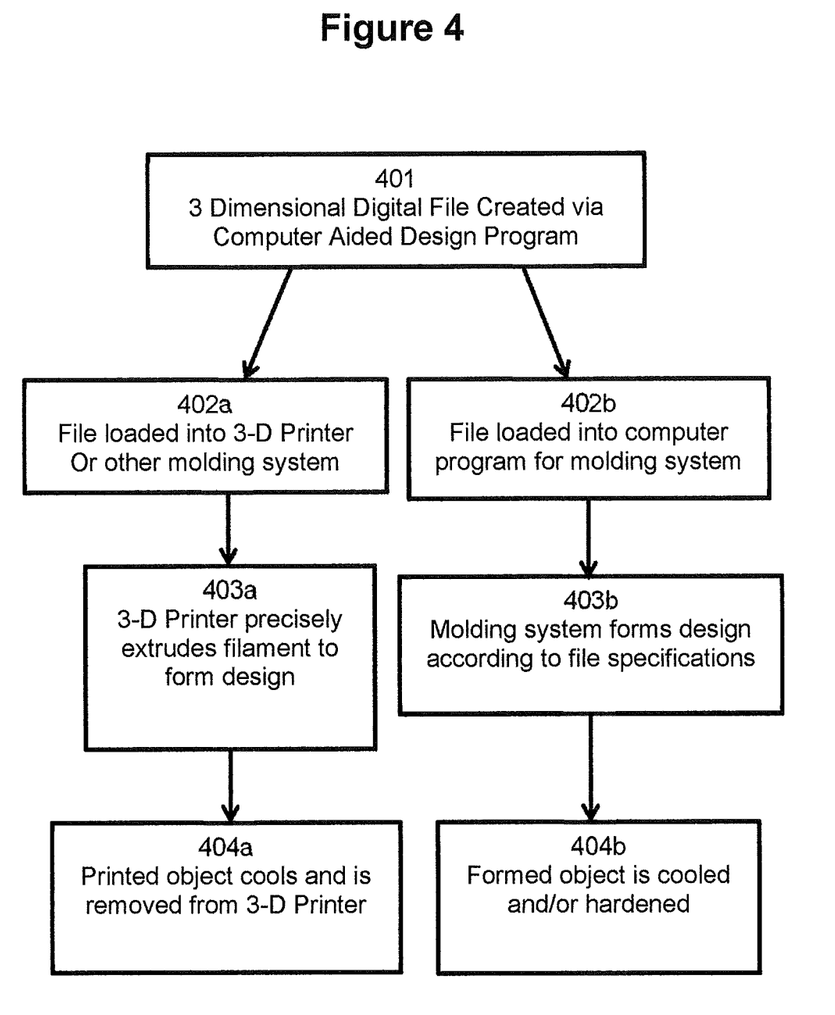
FIG. 4 shows exemplary processes for making the prismatic mold.

An example of a step by step method of the claimed process is illustrated in FIG. 4. In this exemplary embodiment a 3 dimensional digital file is created via computer-aided design in step 401 with precise measurements and spacing determined according to predetermined specifications, such as military regulations or orders. A file is loaded into a 3D printer in step 402a. In another embodiment, a file can be loaded into a computer program for a molding system in step 402b. If 3D printing is selected, after the file is loaded, a 3D printer then precisely extrudes filament to form the requisite design of the mold according to precise specifications in step 403a. If a conventional molding system (e.g., extrusion molding, injection molding, compression molding, transfer molding, or spin casting) is chosen, the system forms (e.g., extrudes, compresses, casts, injects or otherwise shapes) the design of the mold according to file specifications in step 403b. If 3D printing is selected, the printed object is then cooled and is removed from 3-D printer in step 404a. If a molding system is chosen, the formed object is then cooled or hardened as a completed mold in step 404b.

The prismatic mold is unique in there is no mold, or any other device for that matter that is uniquely pre-measured and dimensioned to have both a cavity for a distinguishing device already pre-centered according to military or other uniform specifications and a cavity specifically dimensioned to accommodate and hold a ribbon in a fixed position for secure and precise attachment.

Designing and Dimensioning of the Mold with Computer-Aided Design

Pre-measuring and dimensioning the mold includes: researching the appropriate orders or specifications for the placement of the distinguishing device (e.g., The Berlin Airlift device, a miniature replica of a C-54 aircraft is worn on the Army of Occupation Medal, with the nose pointed upward at a 30-degree angle); designing a three-dimensional indentation to hold the distinguishing device for appropriate attachment in accordance with the required specifications, and forming this three-dimensional indentation accordingly (e.g. the indentation would ensure that The Berlin Airlift device is attached to the ribbon with the nose pointed upward at a 30-degree angle). It also includes forming a cavity positioned over the indentation, the cavity measured and formed to accommodate and hold a ribbon in a fixed position during attachment, and to facilitate removal of the ribbon with the distinguishing device in place.

The designing and dimensioning of the indentation can be performed with a computer program using computer-aided design (CAD). In computer graphics, 3D modeling or three-dimensional modelling is the process of developing a mathematical representation of any surface of an object in three dimensions via specialized software.

In certain embodiments, designing and dimensioning of the cavity and indentation can include researching, recording, and inputting the measurements or aspect ratio (e.g. length, width, height) of the distinguishing device from verified or empirical data, its appropriate orientation (e.g. 30-degree angle, etc.) and if necessary, the required spacing between distinguishing devices (e.g., 10 mm between stars).

The design and dimensions of the indentation and cavity in the mold can be measured and then subsequently formed by any appropriate molding process or 3D-printing.

The designing and dimensioning (e.g. measuring the requisite dimensions for each feature and space of the mold and indentation) can be performed for example, by a computer program in CAD. In one aspect, a CAD system can receive an image such as a photographic image of the distinguishing device and use contours of the distinguishing device as data points for creating a model of the distinguishing device, which can be manipulated in a computer program.

The main CAD methods for creating designs for molds are solid modeling and surface modeling. Surface modeling is based on shaping surfaces by pulling, bending, twisting and stretching them until the required shape is created. The surfaces can be joined together to enclose a volume and so represent complete objects.

Solid modeling is based principally on standard geometric shapes, which can be combined in various ways, mainly developed from the Boolean operations of subtraction, addition and intersection. Conventionally, solid modelers had the advantage of being much easier to learn and use, but they lacked the flexibility of surface modelers in creating complex shapes. Since then, the developers of surface modelers have made their systems much easier to use, while the suppliers of solid modelers have also added more flexible modeling tools. Thus, the distinction between the two types of system is now not so clear-cut.

Many surface and solid modeling programs offer wizards that can automate the creation of the core and cavity design from the part geometry. In both cases, the wizards allow the process to be completed more quickly. However, surface modelers are more flexible when the split surface generated by the automated method needs small adjustments to give the optimal design. In general terms, solid modeling can be better for simpler product designs because it remains easier to use, while the greater flexibility of surface modeling will be better for producing tooling from more complex components.

Once the design for the core and cavity have been finalized, work can begin on the remainder of the mold assembly. Since most mold components are made up from fairly simple, prismatic geometry, solid modeling is the most appropriate method for their design and their assembly into the overall mold. Catalogs of standard mold components can be used to complete the mold design efficiently so that a user does not have to spend time creating these components over and over again. These catalogs can be available in a number of mold design systems. The software can allow the mold-maker to design—quickly and easily—any non-standard components that might be required since few molds can be completed simply from standard components. Once completed, the designs can be added to the user's personal catalog for future use. See, e.g., www.moldmakingtechnology.com/articles/choosing-cad-software-for-3-d-mold-design.

Impression-Molding or Other Manual Molding

In another embodiment, designing and dimensioning can also be done by creating an impression of the distinguishing device (e.g. providing, preparing and dispensing a thick liquid material, such as alginate or polyvinylsiloxane, or other wax or wax-like material into an impression tray and placing the distinguishing device within the material until it dries. The impression can then be left to harden and/or cool, and serve as a mold for the distinguishing device.

The designing of the cavity can also be measured manually to account for the width of the ribbon to ensure it does not wiggle during attachment, and having opposing sidewalls with sufficient height (e.g. half of the ribbon's height) to prevent the ribbon from being dislodged during attachment, but having the length as a flexible dimension.

In certain embodiments, the mold can also be specifically pre-measured and dimensioned to accommodate an amount of adhesive to securely and accurately attach the distinguishing device to the ribbon.

CAD and 3D Printing

In other embodiments, the forming of the indentation and cavity in the mold can be performed by or 3D-printing. 3D printing begins with creating a 3-dimensional object using a computer program. Any suitable program, such as Tinker-CAD, can be used to design the object. Once the design is completed, the design can be uploaded and saved to a 3D printer. The printer will then determine how to create the object layer by layer. The printer uses a heated extruder to melt PLA plastic into a line of filament. The filament is then guided on a predetermined path created by the 3D printer. As the filament is extruded on this path it cools and solidifies. The solid plastic that was extruded then forms an extremely small layer of the object. this is repeated until the physical object is completed, layer by layer. A typical 3D printer is very much like an inkjet printer operated from a computer. It builds up a 3D model one layer at a time, from the bottom upward, by repeatedly printing over the same area in a method known as fused depositional modeling (FDM). Working entirely automatically, the printer creates a model over a period of hours by turning a 3D CAD drawing into lots of two-dimensional, cross-sectional layers—effectively separate 2D prints that sit one on top of another, but without the paper in between. Instead of using ink, which would never build up to much volume, the printer deposits layers of molten plastic or powder and fuses them together (and to the existing structure) with adhesive or ultraviolet light. See, e.g., https://www.explainthatstuff.com/how-3d-printers-work.html.

There can be various molds for various distinguishing devices. Every service will have different orders and regulations with respect to spacing, which will be measured, formed and respected by the variations of the prismatic mold.

Materials

The prismatic mold may be made of any suitable material, such as a polymer, elastomer, rubber, metal or other suitable material that having a sufficient hardness to be molded. The material must allow the mold to be shaped to accommodate a ribbon in its cavity as well as an indentation for the distinguishing device. In some embodiments, the molding surface is comprised of an elastomeric material. The molding surface can also be comprised of a 3D printer filament. In some embodiments, the molding surface can be comprised of polylactic acid (PLA), acrylonitrile butadiene styrene (ABS), polypropylene, polyethylene, rubber, silicone, thermoplastic polymer, or polymeric material In some embodiments, the molding surface is comprised of a biodegradable and thermoplastic aliphatic polyester. In some embodiments, a molding surface is comprised of a coated material. The coating material can provide an additional property to modify the molding surface, such as a non-stick surface, waterproof surface or other property. In some embodiments, the molding surface is integral with the prismatic mold. In other embodiments, the molding surface is removable and can be detached from the prismatic mold.

Process for 3D Printing 3D printing begins with creating a 3-dimensional object using a computer program. Any suitable computer program can be used to design the object. Once the design is complete, you then upload the saved file to your 3D printer.

The printer will then determine how to create the object layer by layer. In certain embodiments, the printer uses a heated extruder to melt PLA plastic into a line of filament. The filament is then guided on a predetermined path created by the 3D printer. As the filament is extruded on this path it cools and solidifies. The solid plastic that was extruded then forms an extremely small layer of the object. This is repeated until the physical object is completed, layer by layer.

A typical 3D printer is very much like an inkjet printer operated from a computer. It builds up a 3D model one layer at a time, from the bottom upward, by repeatedly printing over the same area in a method known as fused depositional modeling (FDM). Working entirely automatically, the printer creates a model over a period of hours by turning a 3D CAD drawing into lots of two-dimensional, cross-sectional layers—effectively separate 2D prints that sit one on top of another, but without the paper in between. Instead of using ink, which would never build up to much volume, the printer deposits layers of molten plastic or powder and fuses them together (and to the existing structure) with adhesive or ultraviolet light. The prismatic mold can be made from PLA (Polylactic Acid) which is a 3D printer filament. However, polylactic acid (PLA), acrylonitrile butadiene styrene (ABS), polypropylene, polyethylene, rubber, silicone, thermoplastic polymer, or polymeric material, a rubber, metal, polymeric, or other type mold may be used.

Extrusion Molding

Extrusion is a method by which molten plastic or any other material is pushed through a two-dimensional die opening. An advantage in using the extrusion process over other methods is its ability to create complex cross-sections. Additionally, both stiff or soft materials can be formed into any shape and the finished materials have a smooth surface finish when compared to other processes. With both the injection molding and extrusion processes, there is minimal waste as the scrap can be recycled again. Materials used can include polyethylene (PE), polypropylene, acetal, acrylic, nylon (polyamides), polystyrene, polyvinyl chloride (PVC), acrylonitrile butadiene styrene (ABS) and polycarbonate.

Injection Molding

Injection molding is a manufacturing process for producing parts by injecting molten material into a mold. Injection molding can be performed with a host of materials mainly including metals (for which the process is called die-casting), glasses, elastomers, and most commonly thermoplastic and thermosetting polymers. Material for the part is fed into a heated barrel, mixed (using a helical shaped screw), and injected or forced into a mold cavity, where it cools and hardens to the configuration of the cavity. After a product is designed, usually by an industrial designer or an engineer, molds are made by a mold-maker (or toolmaker) from metal, usually either steel or aluminium, and precision-machined to form the features of the desired part. Parts to be injection molded must be very carefully designed to facilitate the molding process; the material used for the part, the desired shape and features of the part, the material of the mold, and the properties of the molding machine must all be taken into account. The versatility of injection molding is facilitated by this breadth of design considerations and possibilities. Materials that can be used this type of molding can include acrylonitrile butadiene styrene (ABS), polyethylene, polypropylene, polycarbonate, polyamide, polystyrene.

Advances in 3D printing technology, using photopolymers which do not melt during the injection molding of some lower temperature thermoplastics, can be used for some simple injection molds.

Compression Molding

Compression Molding is a method of molding in which the molding material, generally preheated, is first placed in an open, heated mold cavity. The mold is closed with a top force or plug member, pressure is applied to force the material into contact with all mold areas, while heat and pressure are maintained until the molding material has cured. The process employs thermosetting resins in a partially cured stage, either in the form of granules, putty-like masses, or preforms. Compression molding is a high-volume, high-pressure method suitable for molding complex, high-strength fiberglass reinforcements. Advanced composite thermoplastics can also be compression molded with unidirectional tapes, woven fabrics, randomly oriented fiber mat or chopped strand. The advantage of compression molding is its ability to mold large, fairly intricate parts. Also, it is one of the lowest cost molding methods compared with other methods such as transfer molding and injection molding; moreover it wastes relatively little material, giving it an advantage when working with expensive compounds. Materials used can be similar to those used injection molding can be provided in granules or putty preforms.

Transfer Molding

Transfer molding is a manufacturing process where casting material is forced into a mold. Transfer molding is different from compression molding in that the mold is enclosed rather than open to the fill plunger resulting in higher dimensional tolerances and less environmental impact. Compared to injection molding, transfer molding uses higher pressures to uniformly fill the mold cavity. This allows thicker reinforcing fiber matrices to be more completely saturated by resin. Furthermore, unlike injection molding the transfer mold casting material may start the process as a solid. This can reduce equipment costs and time dependency. The transfer process may have a slower fill rate than an equivalent injection molding processes. The mold interior surfaces may be gel-coated. If desired the mold is first pre-loaded with a reinforcing fiber matrix or preform. Fiber content of a transfer molded composite can be as high as 60% by volume. The fill material may be a preheated solid or a liquid. It is loaded into a chamber known as the pot. A ram or plunger forces material from the pot into the heated mold cavity. If feed-stock is initially solid, the forcing pressure and mold temperature melt it. Standard mold features such as sprue channels, a flow gate and ejector pins may be used. The heated mold ensures that the flow remains liquid for complete filling. Once filled the mold can be cooled at a controlled rate for optimal thermoset curing. Materials used can be similar to those used injection molding or compression molding, and can also include epoxy, polyester, plastic, or silicon rubber.

Spin Casting

Spin casting, also known as centrifugal rubber mold casting (CRMC), is a method of utilizing centrifugal force to produce castings from a rubber mold. Typically, a disc-shaped mold is spun along its central axis at a set speed. The casting material, usually molten metal or liquid thermoset plastic, is then poured in through an opening at the top-center of the mold. The filled mold then continues to spin as the metal solidifies or the thermoset plastic sets. Materials used can include those used in the previously discussed molding methods as well as iron, steel, stainless steel, glass, alloys of metals such as aluminum, copper and nickel.

Different compositions may be prepared according to various methods with substantially the same result. Thus, however detailed the foregoing may appear in text, it should not be construed as limiting the overall scope hereof. All references cited herein are hereby incorporated by reference herein in their entirety. Other embodiments are within the scope of the following claims

What is claimed is:

1. A prismatic mold comprising:
   at least a first molding surface and a second molding surface wherein the second molding surface is positioned at an angle less than 180 degrees to the first molding surface;
   each of said molding surfaces comprises
   a floor having a longitudinal axis and a transverse axis, the floor comprising at least one indentation in a three-dimensional shape of a distinguishing device, the indentation having a volume that accommodates the distinguishing device and an adhesive, the indentation having a lowest point, the distance between the lowest point and the floor forming a second depth of the molding surface,
   a sidewall having a length along said longitudinal axis of the floor and extending upward from the floor to a height that forms a first depth of the molding surface; said sidewall preventing a ribbon positioned over the distinguishing device from movement in a latitudinal plane; and
   a stopping wall having a length along a transverse axis of the floor and extending upward from the floor, said stopping wall preventing a ribbon positioned over the distinguishing device from movement in a longitudinal plane.

2. The prismatic mold of claim 1, wherein the distinguishing device is a star, 5/16 inch star, an arrowhead, a campaign clasp, a campaign star, a citation star, an enlistment bar, an insignia, a globe, a loop, an hourglass, a cross, an "A" device, an "M" device, an "N" device, a commendation star, an oak leaf cluster, an operational distinguishing device, an "R" device, a service star, a strike numeral, a flight numeral, or a "V" device.

3. The prismatic mold of claim 1 wherein the ribbon is a military ribbon.

4. The prismatic mold of claim 1 wherein at least one molding surface comprises a second sidewall extending upward from the floor opposite said first sidewall.

5. The prismatic mold of claim 1, wherein at least one molding surface further comprises a second indentation.

6. The prismatic mold of claim 1, wherein at least one molding surface further comprises a plurality of indentations.

7. The prismatic mold of claim 1, further comprising a third molding surface comprising a floor and opposing sidewalls, the third molding surface positioned at an angle to each of the first and second molding surfaces.

8. The prismatic mold of claim 7, further comprising a fourth molding surface comprising a floor and opposing sidewalls, the fourth molding surface positioned at an angle to each of the first, second, and third molding surfaces.

9. The prismatic mold of claim 1, wherein the prismatic mold has a square cross-section, each side of the prismatic mold comprises a molding surface.

10. The prismatic mold of claim 1, wherein at least one molding surface is comprised of an elastomeric material.

11. The prismatic mold of claim 1, wherein at least one molding surface is 3D printed.

12. The prismatic mold of claim 1, wherein at least one molding surface is comprised of polylactic acid (PLA), acrylonitrile butadiene styrene (ABS), polypropylene, polyethylene, acetal acrylic, nylon, polyamide, polystyrene, polyvinyl chloride, polycarbonate, rubber, silicone, thermoplastic polymer, or polymeric material.

13. The prismatic mold of claim 1, wherein at least one molding surface is comprised of a biodegradable and thermoplastic aliphatic polyester.

14. The prismatic mold of claim 1, wherein at least one molding surface is comprised of a coated material.

15. The prismatic mold of claim 1, wherein at least one molding surface made of the same material as the prismatic mold.

* * * * *